United States Patent [19]
Blicher et al.

[11] Patent Number: 5,437,393
[45] Date of Patent: Aug. 1, 1995

[54] APPARATUS FOR DELIVERING BULK FOODS

[75] Inventors: Steen Blicher, Dorthesvej, Denmark; Logan Langballe, Winnetka, Ill.

[73] Assignee: System Feed Inc., Winnetka, Ill.

[21] Appl. No.: 165,086

[22] Filed: Dec. 10, 1993

[30] Foreign Application Priority Data

Dec. 11, 1992 [DK] Denmark ............................ 1493/92
May 19, 1993 [DK] Denmark ............................ 0582/93

[51] Int. Cl.⁶ ........................ G01G 13/00; B67D 5/06
[52] U.S. Cl. ........................... 222/77; 222/135; 222/165; 222/185.1; 222/363; 141/369
[58] Field of Search ............... 222/160, 164, 165, 166, 222/181, 185, 363, 366, 368, 452, 77, 129, 135, 132; 141/83, 369, 370

[56] References Cited

U.S. PATENT DOCUMENTS

| | | | |
|---|---|---|---|
| 1,184,379 | 5/1916 | Ritter | 222/160 |
| 1,296,788 | 3/1919 | Frederick | 222/363 X |
| 1,540,165 | 6/1925 | Cytron | 222/165 X |
| 1,546,468 | 7/1925 | Bernier | 222/363 X |
| 2,532,698 | 12/1950 | Corkins | 222/363 X |
| 2,710,125 | 6/1955 | Brown | 141/369 X |
| 3,312,374 | 4/1967 | Whitlock . | |
| 3,426,853 | 2/1969 | Del Rosso | 222/363 X |
| 4,006,850 | 2/1977 | Farina . | |
| 4,165,024 | 8/1979 | Oswalt et al. . | |
| 4,211,343 | 7/1980 | Hughes et al. . | |
| 4,287,921 | 9/1981 | Sanford . | |
| 4,527,716 | 7/1985 | Haas et al. . | |
| 4,562,941 | 1/1986 | Sanfilippo . | |
| 4,569,463 | 2/1986 | Pellegrino | 222/181 |
| 4,592,494 | 6/1986 | Ellis et al. . | |
| 4,650,098 | 3/1987 | Ellis et al. . | |
| 4,718,578 | 1/1988 | Radek et al. . | |
| 4,889,263 | 12/1989 | Ellis et al. . | |
| 5,105,991 | 4/1992 | Johnson . | |
| 5,244,020 | 9/1993 | Bruno et al. | 222/165 X |
| 5,265,654 | 11/1993 | Larsen | 141/83 |

*Primary Examiner*—Kevin P. Shaver
*Attorney, Agent, or Firm*—Rockey, Rifkin and Ryther

[57] ABSTRACT

An apparatus for handling, sorting, apportioning, packaging and dispensing bulk food products is disclosed. The apparatus comprises a dispenser which is connected to a reservoir containing a supply of a dry, granular foodstuff. The dispenser receives and dispenses a predetermined portion of the foodstuff from the reservoir through a dispensing opening. In one embodiment, a predetermined portion of the foodstuff is received by the dispenser by rotating a manually operated rotatable member. The reservoir is rotatably attached to a mounting rack, the rotation of the reservoir permitting access to its interior to fill it with foodstuff to be dispensed. A plurality of dispensing systems, each containing a different foodstuff, can be juxtaposed to form a foodstuff dispensing bar.

18 Claims, 8 Drawing Sheets

APPARATUS FOR DELIVERING BULK FOODS

BACKGROUND OF THE INVENTION

The invention relates to a method and apparatus for handling and delivering fragile bulk food products especially breakfast cereals such as cornflakes and the like from the production stage to consumption. Specifically, the invention relates to a system in which the manufacturer delivers the product in large containers to the place of sale where each large container holds several sales portions. The consumer measures and packages a given amount of product in a selected package without the possibility of contamination of the product.

It is well known that packaging for breakfast cereals such as cornflakes are disposable and that such packaging constitutes a substantial part of the product's price. Along with the unnecessary increase in price, the consumer also has the burden to dispose of the empty package which has a negative impact on the environment. Moreover, manufacturers and retailers are reluctant to introduce unusual solutions to these problems if there is any risk of losing sales.

The usual product packaging system from the manufacturer to the consumer consists of the following operations or components:

1) portioning the product from storage into sales volume units;
2) packing the product into bags;
3) placing the bags into cartons:
4) placing the filled and closed cartons into large trays;
5) protecting the cartons on the trays with shrink-film or paper;
6) placing the trays on pallets;
7) protecting and securing the trays to the pallets with shrink-film;
8) receiving the pallets at the store and discarding the shrink-film or paper and the trays;
9) arranging a display of cartons on the store shelves;
10) cleaning the display area;
11) choosing a carton from the shelves by a customer;
12) paying for the carton at the cashier and placing the carton in a grocery bag;
13) discarding the grocery bag;
14) placing the carton in the consumer's kitchen cabinet or emptying the carton's contents into a reusable container;
15) serving the product directly from the carton or container;
16) discarding the empty carton into a garbage container; and
17) emptying the garbage container into an outside garbage container.

As will be apparent, this process requires that the carton holding the product be handled to a large degree thereby requiring that the packaging be made of strong material resulting in added cost. To be able to place the bags in the cartons, the bags must have less volume than the cartons. Moreover, the handling causes shaking of the carton that results in breakage. The customer finds the low volume and breakage unacceptable. As a result, the manufacturer must explain in writing on the carton that the cartons are filled by weight and that the unused or unfilled part of the carton is due to settling of the product during transportation. Samples from several breakfast cereal products show that it is customary to find the cartons to be only two-thirds full.

Another downside to the use of cartons is the use of shelf space in the retail stores and the labor necessary to keep order on the shelves. A problem for the consumer is that the cartons are unnecessarily large and two cartons will take up the space of a regular grocery bag. In one known method that eliminates the poor utilization of resources and poorly used throw-away cartons, the bag filled with the product is not placed in the carton but all of the other functions and packaging described above are maintained. The downside with this method is that the product, without the protection of the carton, will have a higher degree of physical abuse during the handling from the manufacturing site to the consumer, which will result in significant breakage of the produce and poor presentation on the retail shelves.

SUMMARY OF THE INVENTION

Through this invention, a process is presented to handle, sort, apportion and package bulk products that makes it possible to reduce the amount of packaging material and at the same time causes a minimum of breakage, reduces the space location in the store and creates a great display. In the process according to the invention, the customer makes the portioning of the product in connection with the choice of container that can be a specially constructed reusable container or a simple disposable bag designed to carry the goods from the store to the home. The invention is designed in such a way that it fits side by side with other displays of the same products. As a result, the customer has a choice of packaging without any sales risk for the producer.

The system of the invention consists of the following process operation components:

1) portioning from production to large bag with several sales portions;
2) placing the bag in a reusable palletbox;
3) emptying the bag into a dispensing unit at the store location;
4) throwing away the large bag;
5) customers portioning the product into their own chosen package;
6) paying at the cashier;
7) placing the filled container/bag into the grocery bag;
8) placing the container/bag into the kitchen cabinet;
9) dispensing product directly from container/bag: and
10) refilling the empty dispenser.

The invention process can be used in connection with any type of goods that needs to be dispensed into portions. The product can also be a mix of different types of products as long as the mix is made to be dispensed into portions. The product can also consist of separate packaged part-portions if these can be portioned out according to the process. The process as described in the invention can consist of several successive portionings. For example, one manufacturer may portion out a measure to a wholesaler who portions out a portion for retail sale. The customers then portion out a portion in any amount they wish, and finally the measured amount can be portioned out in meal size portions directly for consumption.

The portioning can be made once or several times either by volume or by weight. The portioning can, as described in the process of the invention, be done in such a way that it is displayed side by side with traditional packaging thereby enabling the customer to make a choice between the traditional cartons and the dispensing units. Alternatively, the dispensing units can be placed next to each other to create a cereal bar which offers the customer a choice between different goods distributed according to the invention.

The invention also describes an apparatus to be used with the above mentioned process in connection with a storage system that makes it possible to make a portion by volume or, by adding mechanical or electronic means shown on the drawing to the apparatus, to portion by weight.

BRIEF DESCRIPTION OF THE DRAWINGS

FIGS. 1(A–F) schematically show the process of the invention.

DETAILED DESCRIPTION OF THE INVENTION

Figure 1A:
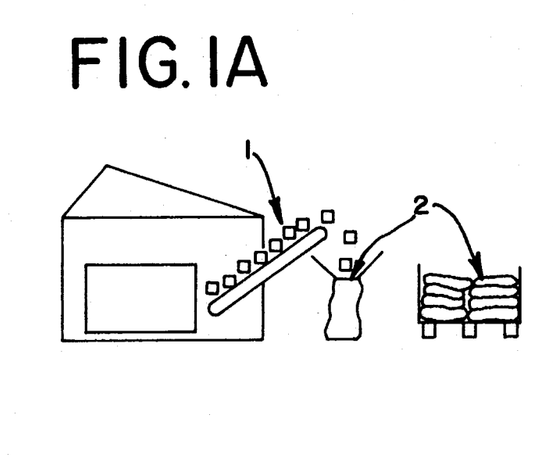
Figure 1B:
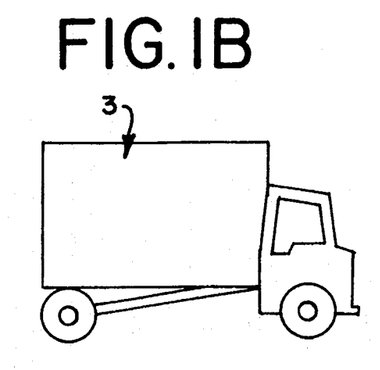
Figure 1C:
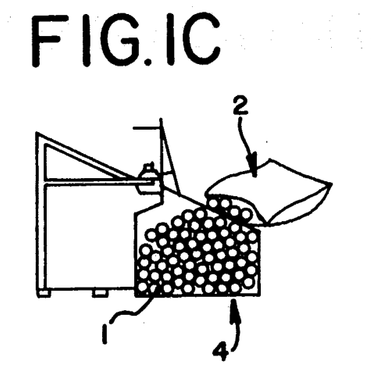

In FIG. 1(A), a given bulk object 1, such as cereal, is loaded directly from production line 2 into bags 2a and placed on transport pallet 2b. In FIG. 1(B), bags 2a are transported to the place of sale by, for example, truck 3. FIG. 1(C) shows how a large bag 2a with several portions of bulk product is emptied into dispensing unit 4 which is in the loading position.

Figure 1D:
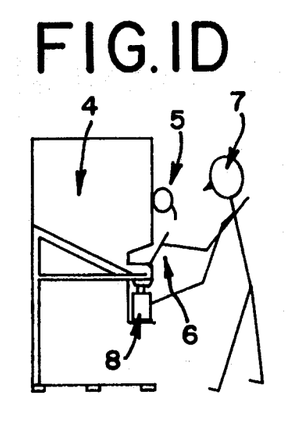
Figure 1E:
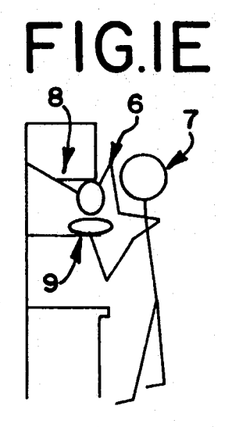
Figure 1F:
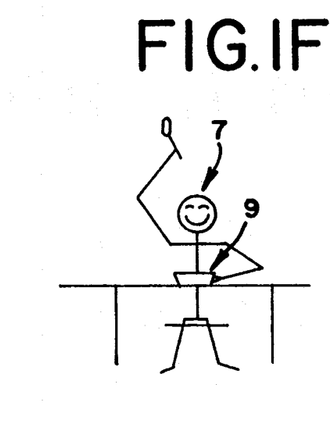

FIG. 1(D) shows how customer 7 places reusable container 8 under the dispensing unit which is operated by pulling handle 6. Position 5 shows disposable bags that can be used at the customer's option instead of reusable container 8. FIG. 1(E) shows reusable container 8 placed in a portioning dispenser with the ability to portion out meal portions, where consumer 7, by pulling handle 6, receives the exact amount in bowl 9 which is ready to be served FIG. 1(F).

Figure 2:
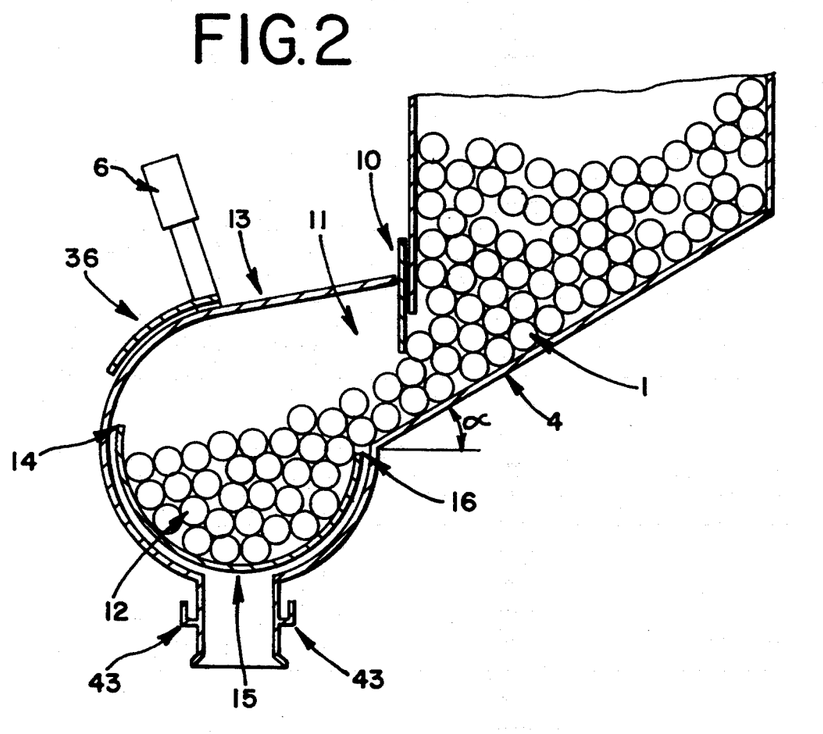
FIGS. 2 and 3 show a design of the dispensing unit for use with the process of FIG. 1.

FIG. 2 shows the dispensing unit with cereal 1 in the reservoir 4, where the bottom surface of reservoir 4 is angled relative to horizontal at an angle "Alpha". Angle alpha is at least the angle of repose for the bulk product, i.e., the angle at which the material will slide under gravity where entry to the dispensing unit 13 is stopped by slide 10. The cereal moves by gravity down into dispensing unit 15 which is rotatable around its own center.

Figure 3:
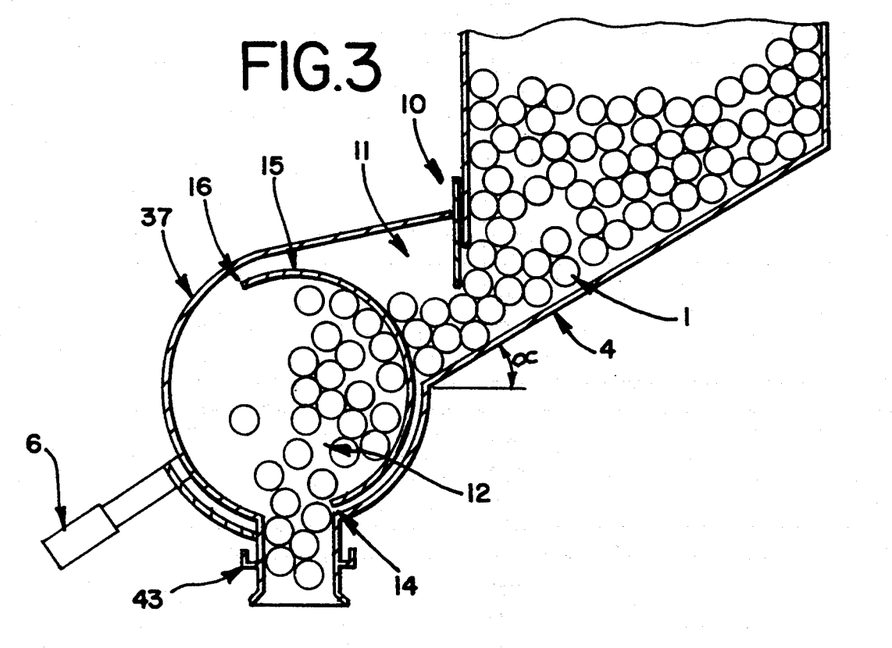

Handle 6 is connected to measuring device 15 such that downward movement of the handle, as shown in FIG. 3, turns dispensing unit 15. This causes edge 16 to move up through cereal 1 into airpocket 11, the remaining bulk product or cereal particles to be separated by edge 16's upward movement and measured amount 12 to be separated from dispensing unit 37 with a delivered message marked on the unit.

Figure 4:
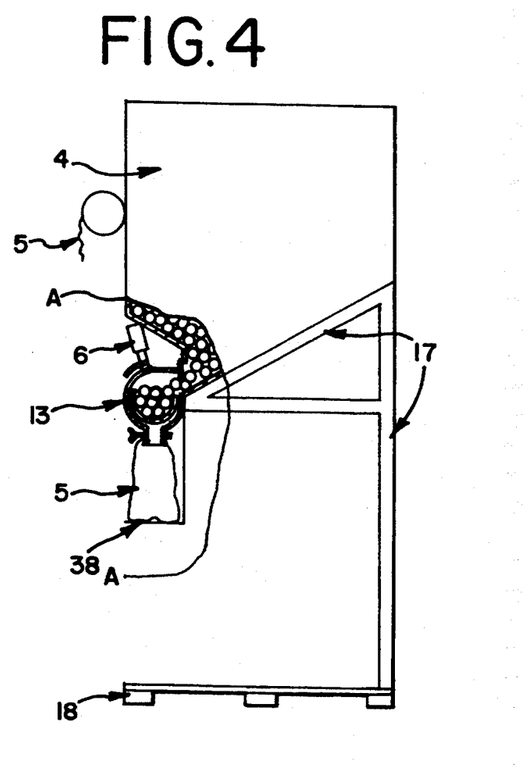
FIGS. 4, 5, 6 and 7 show the dispensing unit in operation.
Figure 5:
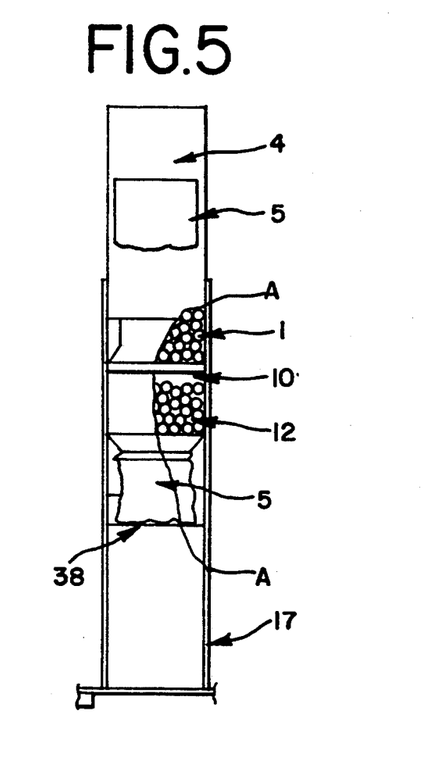

FIG. 4 shows portioning unit 13 with reservoir 4 placed on rack 17 which is bolted to transport pallet 18. Above handle 6 is placed a holder for disposable bags 5. Support shelf 38 for bags 5 is placed to support a bag 5 when it is filled. FIG. 5 shows that the capacity of portioning apparatus measuring element 15 is partly controlled by the diameter and partly by the length. The capacity can be adjusted by moving plate 10 in a vertical direction and FIG. 2 shows how the volume of measuring unit 15 is changed.

Figure 6:
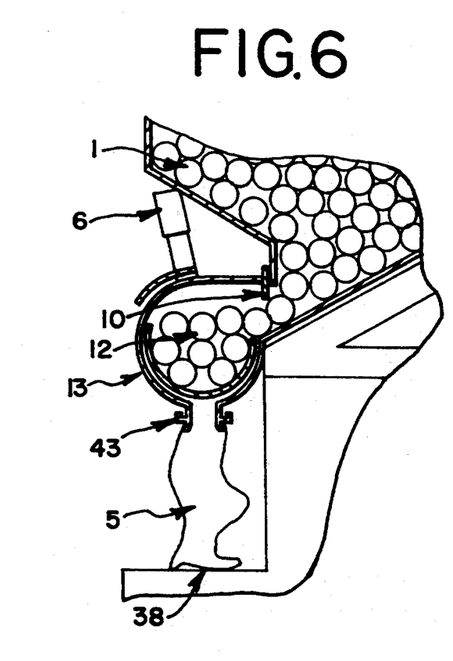
Figure 7:
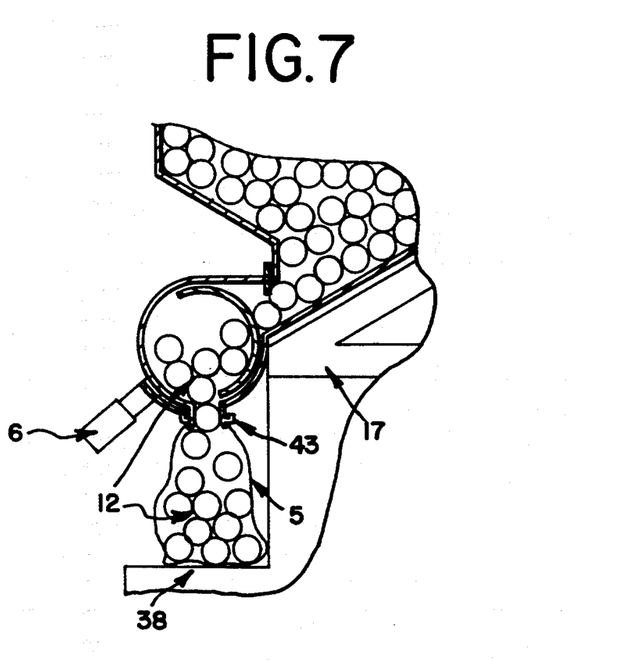
Figures 8, 9:
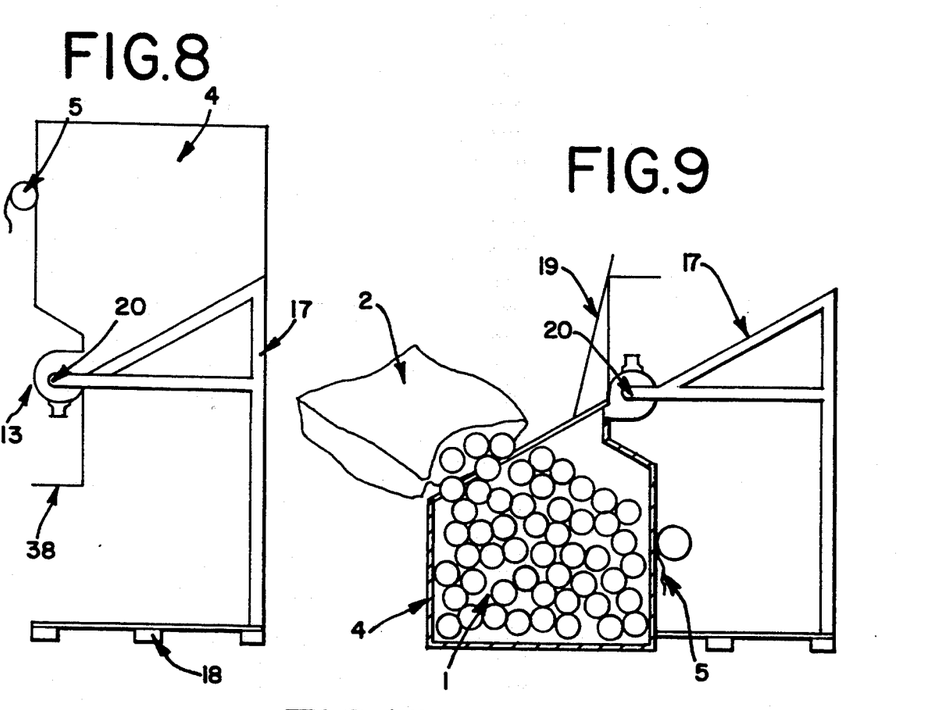
FIGS. 8 and 9 show the filling of the dispensing unit.

FIG. 6 shows the portioning unit in a filled position with the bag fastened to the portioning unit mouth by hooks 43. FIG. 7 shows the same view as FIG. 6 in the emptying position where measured portion 12 has been separated from cereal 1 by measuring unit 15's turn, with measured portion 12 being delivered into bag 5. FIG. 8 shows the portioning unit (13, 5, 4, 38) bolted and hinged to rack 17 in centerline 20 of measuring device 15. Rack 17 is bolted to a transport pallet 18, as shown in FIG. 8, such that reservoir 4 can be turned 180° as shown in FIG. 9. This allows reservoir 4 to be filled with cereal 1 from large bag 2 through the opening in the bottom of the reservoir after the lid 19 is opened.

Figure 10:
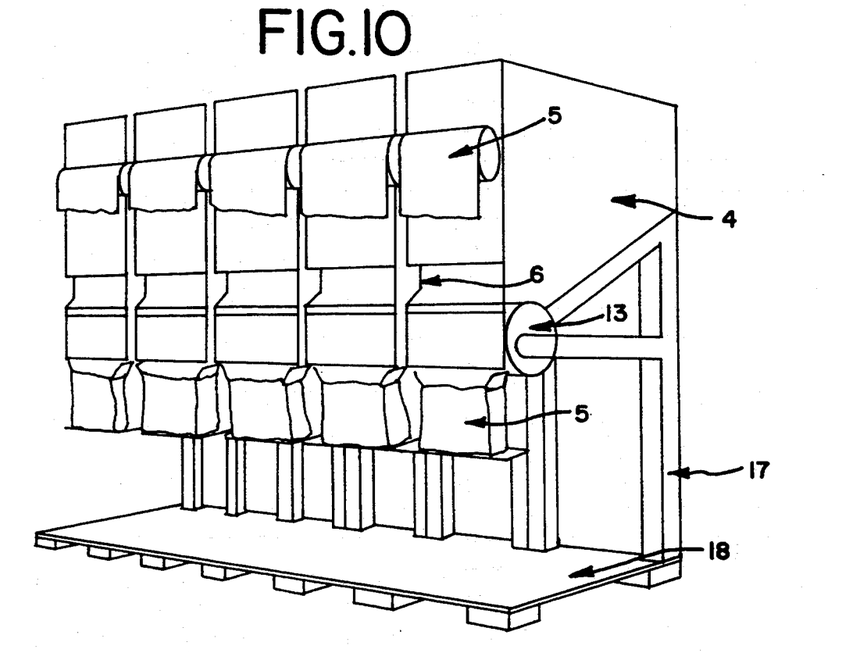
FIG. 10 shows the dispensing unit displayed as a bar.
Figure 11:
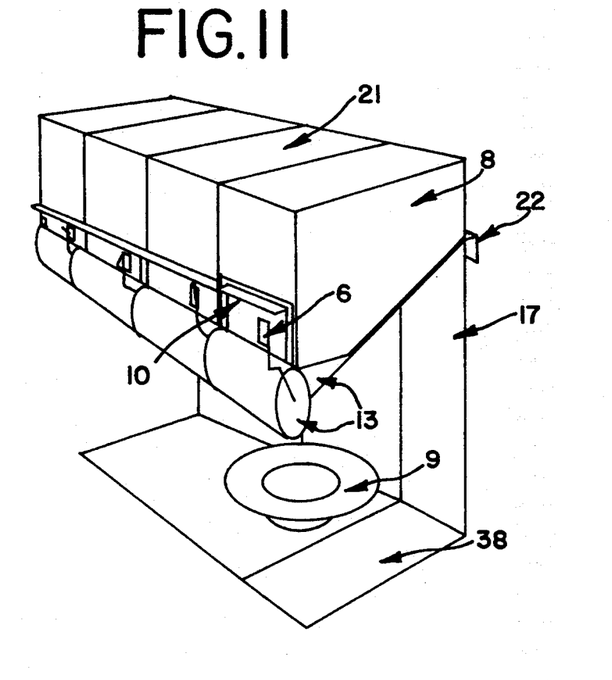
FIG. 11 shows a dispensing unit for portioning meal size portions.

FIG. 10 shows a juxtaposition of several portioning units to form a cereal bar. FIG. 11 illustrates the cereal bar portioning units of FIG. 10 including mounting hardware 22 which allows rack 17 to be hung on a wall. Also, the rack's horizontal part includes a shelf 38 to accommodate the consumer's container which is illustrated as a plate or bowl 9 in FIG. 11. Portioning unit 13 is permanently attached to rack 17. The unit is fixed horizontally as well as downwardly in the direction of cereal reservoir 8 which includes plate 10 to adjust the measured amount.

Figure 12:
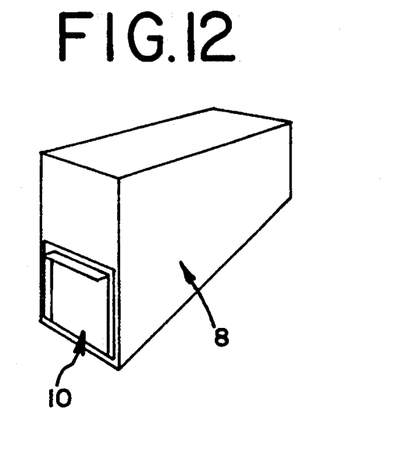
FIGS. 12 and 14 show the reusable container.
Figure 13:
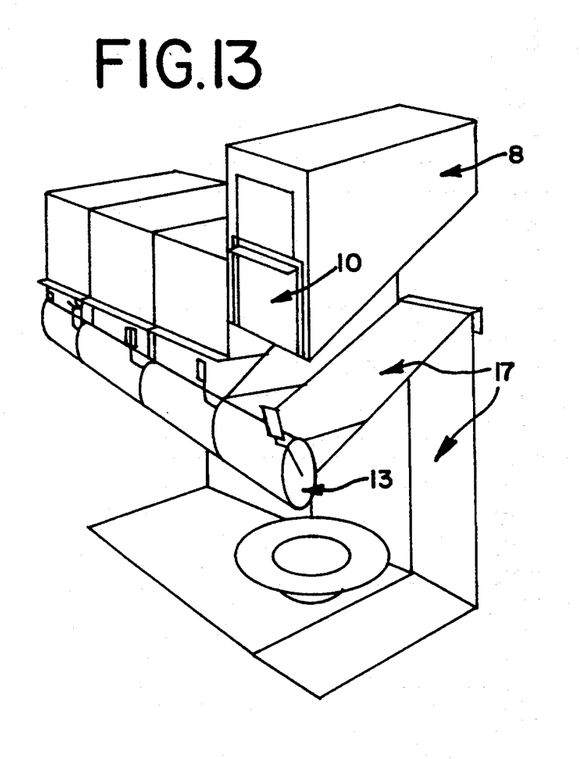
FIG. 13 shows how the reusable container becomes a part of the dispensing unit.
Figure 14:
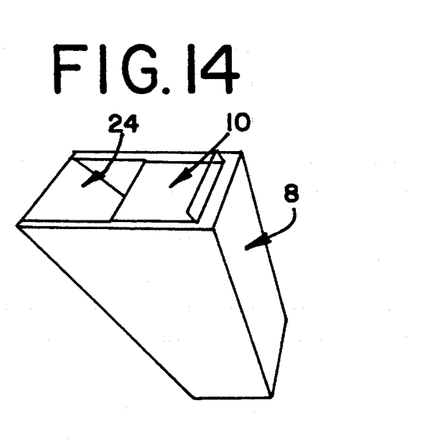
Figure 15:
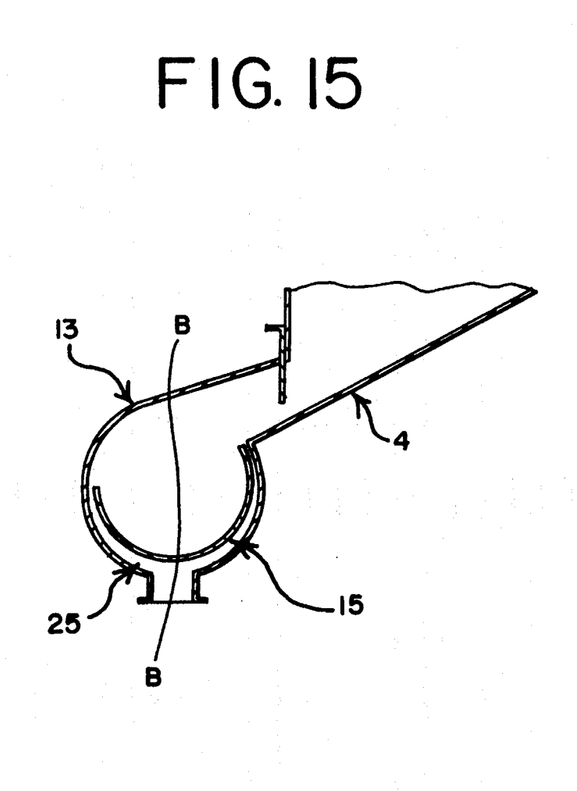
FIGS. 15 and 16 show the design where the portioning is done by weight.

Cereal reservoir 8 is shown disconnected from frame 17 in FIG. 13. FIG. 12 shows cereal reservoir 8 with adjustable plate 10 which, when fully opened as shown in FIG. 14, allows cereal reservoir 8 to be filled. FIG. 15 shows the arrangement of measuring unit 15 with the portioning unit to provide vertical space 25 in which an electronic or mechanical scale is disposed.

Figure 16:
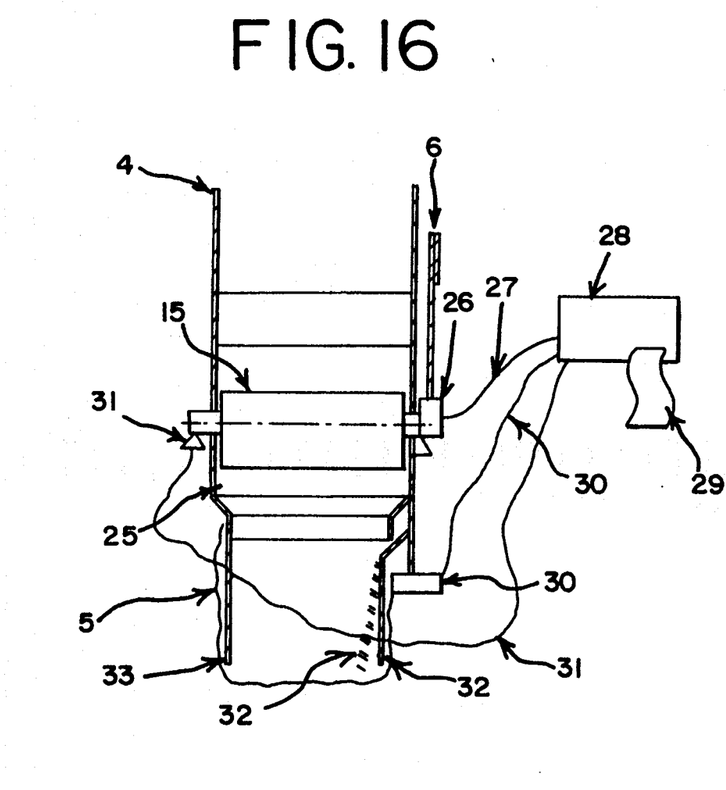

FIG. 16 is a cross-section taken along lines B—B in FIG. 15 showing measuring unit 15 as placed on weighing cells 31 which is connected to a calculator 28 by wire 27. Hardware 33 holds reusable container 5 fixed between stationery plate 33 and moveable arm 32 such that its movement is registrable by sensor 30 which is connected to calculator 28. When handle 6, which is connected with measuring unit 15, is turned to the dispensing position, coupling 26 generates a pulse which is sent over wire 27 to signal calculator 28 to type out a weighing slip.

Figures 17, 18:
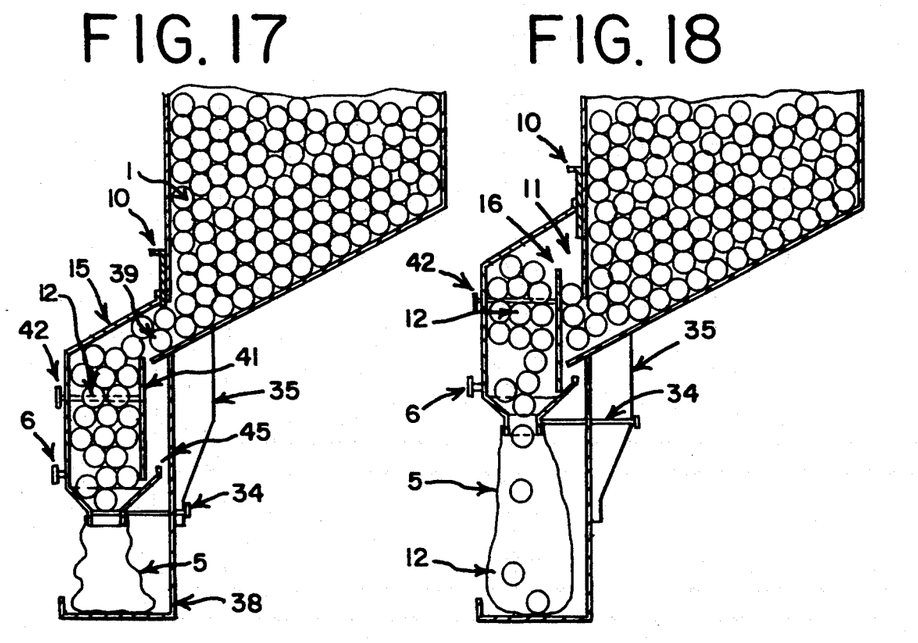
FIGS. 17 and 18 show an alternate design of the dispensing unit.

FIGS. 17 and 18 illustrate a second embodiment of the portioning apparatus. The common elements between the two portioning apparatus embodiments are labeled with the same reference numbers and only the new elements are discussed as follows. Box-shaped measuring unit 15 includes an opening 39 defined by the reservoir's lower plate 4 and adjustable slide 10's lower edge. Because lower plate 4 is disposed at an angle alpha which is larger than the goods natural moving angle, goods 1 will slide on lower plate 4 down into measuring chamber 15 until it is filled.

The capacity of measuring chamber 15 can be altered by adjusting screw 42 which turns chamber 15's lower plate 41 over its upper edge 16. The lower limit of measuring chamber 13 is slide 34 which is connected to vertical curved plate 35 such that the slide opens when it follows the curve. FIGS. 17 and 18 show the dispensing function after reusable container 5 is placed around funnel 40. In FIG. 17, the measuring unit is filled.

Upward movement of handle 6 causes goods 1 to be separated from measured amount 12 by the vertical movement of the measuring unit and back side 41's upper edge 16 moving up through goods 1. Upper edge 16 is sharp to facilitate the separation. The reservoir's vertical wall is offset from plate 41 such that the upward movement of the measuring unit forms an air pocket 11 between the measuring unit and the reservoir's wall. Particles that otherwise would be pushed upwards when edge 16 moves through the goods fall free from the edge. FIG. 18 illustrates the measuring unit in the upper position where funnel 34 is setoff by curved plate 35 after plate 41 has separated goods 1. Thus, measured amount 12 freely falls into container 5.

Figure 19:
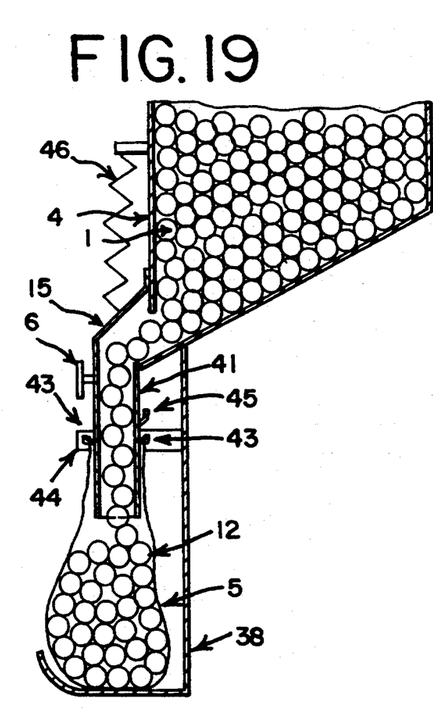
FIGS. 19 through 24 show various alternate designs for the dispensing unit of the invention.
Figure 20:
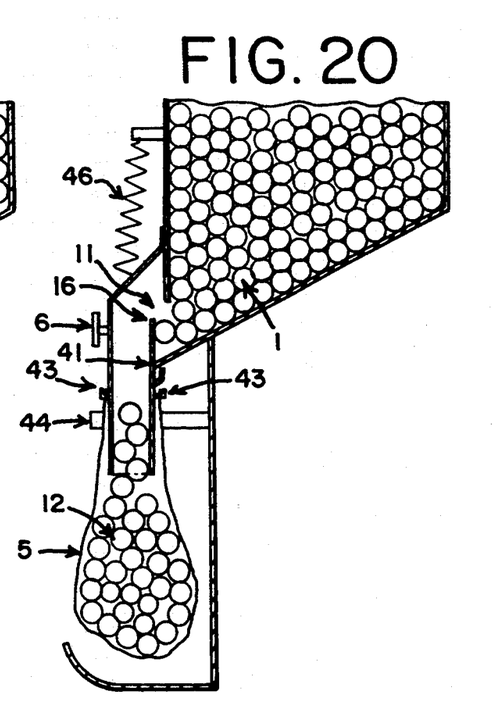

FIGS. 19 and 20 illustrate an embodiment of the dispensing apparatus where bag 5 is an integral part of a box-shaped measuring device. Spring 46 biases the measuring device in an upper position such that side 41 limits access to goods 1. As shown in FIG. 20, attaching a specially sized bag with handles 5 to hooks 43 allows goods measuring to take place when the lower part of the measuring device is inside bag 5. Downward movement of handle 6 lowers back wall 41 to the level of the reservoir's lower edge which allows goods 1 to freely move through measuring device 15 into bag 5.

When bag 5 is filled to the lower edge of the measuring device, releasing handle 6 allows spring 46 to return the measuring device back to the starting position where edge 16 moves up and separates the goods from the measured amount. Bag 5 then can be taken off hooks 43 and separated from the measuring device causing measured amount 12, stored in the tube, to fall into bag 5. Shield 44 is included with shelf 38 to ensure that the bag is not removed while the handle is lowered which would give access to reservoir 4. When the handle is in the upper position, shield 44 is removed so that bag 5 can be removed.

Figure 21:
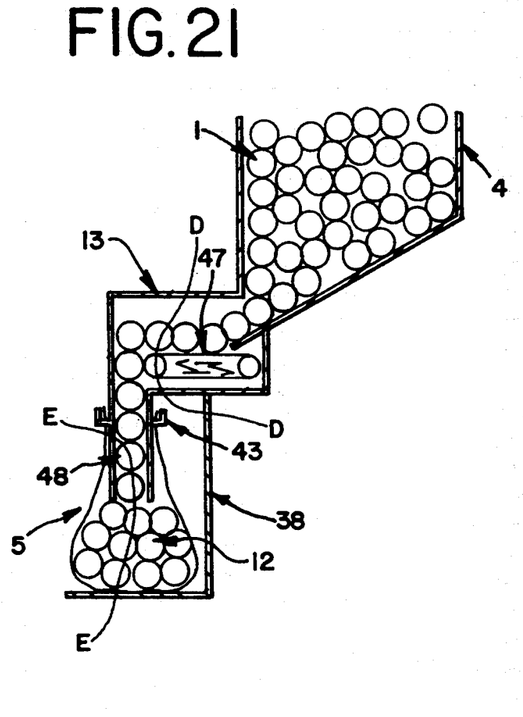
Figure 22:
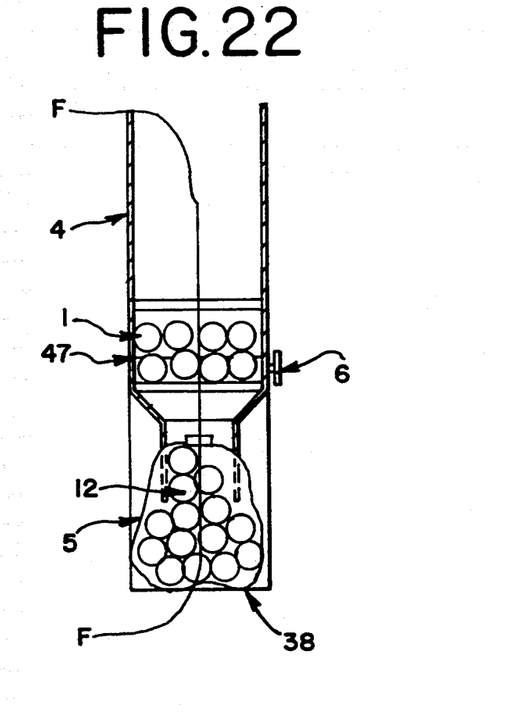

FIGS. 21 and 22 show a second embodiment of the invention where the container is an integrated part of the measuring device and where the goods are separated without the scissor effect. The reservoir's opening is placed immediately over a moveable part which is shown as a manually operated transport band 47 built in to portioning unit 13. During portioning, all of the goods from the reservoir land on band 47. A downwardly extending pipe 48 is attached at the end of band 47 to direct the portioned goods into container 5. Pipe 48 has a smaller cubic volume than container 5 so that the goods to be dispensed in pipe 48 will fit inside container 5 without overflow when container 5 is removed.

Figure 23:
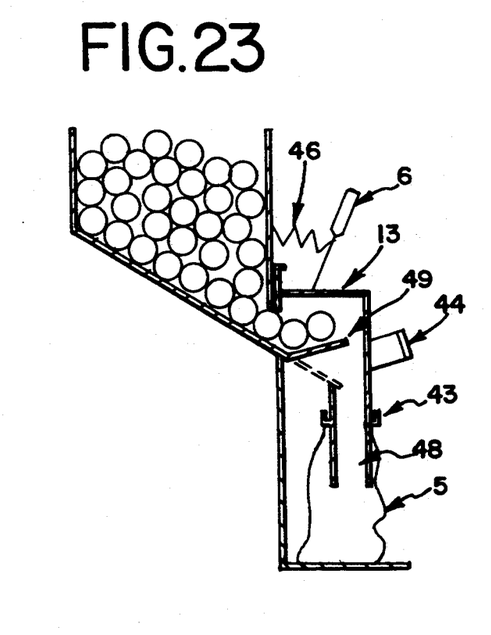
Figure 24:
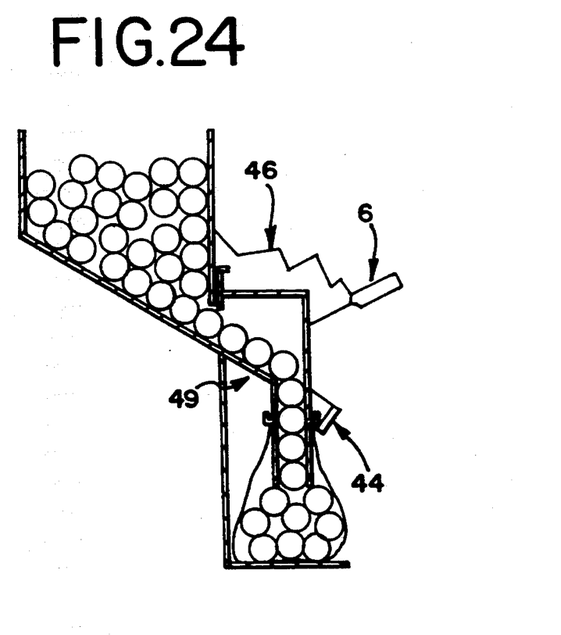

In the embodiment of FIG. 23, a vibration or another device can be installed in a horizontal turntable. When in its horizontal position, the goods cannot be dispensed from the reservoir. When in its downward position, as illustrated in FIG. 24, the goods can be portioned from the reservoir over the angled plate down into the measuring device. Handle 6 moves plate 49 and includes a shield 44 that precludes the removal of container 5 when handle 6 is in its lowered position.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A system for dispensing a desired portion of a dry, granular foodstuff comprising:
    a) a reservoir containing a supply of said foodstuff;
    b) a dispenser compartment communicating with said reservoir to receive foodstuff therefrom;
    c) separator means (10) for limiting the quantity of foodstuff permitted to pass from said reservoir to said dispenser compartment; and
    d) dispenser means connected to said dispenser compartment for dispensing said foodstuff from said dispenser compartment,
    whereby the user may select the amount of foodstuff to be transferred from the reservoir to the dispenser compartment and then dispense the selected amount.

2. The dispensing system of claim 1 wherein said reservoir and said dispenser compartment have integral bottom surfaces which are downwardly disposed at an angle with respect to the horizontal, said angle being sufficient so that said foodstuff will slide on said bottom surfaces, due to the force of gravity, into said dispensing compartment when permitted by said separator means.

3. The dispensing system of claim 1 wherein said separator means comprises a vertically moveable partition for selectively limiting the amount of foodstuff permitted to pass from the reservoir to said dispenser compartment as a function of its vertical position.

4. The dispensing system of claim 1 further comprising means, associated with said dispenser means, for weighing said predetermined portion.

5. The dispensing system of claim 1 further comprising a mounting rack to which said dispenser compartment is rotatably attached thereby to permit the reservoir to be rotated from an upright dispensing position to an inverted filling position, said reservoir including a removable lid for allowing said reservoir to be filled with foodstuff to be dispensed.

6. The dispensing system of claim 1 wherein said separator means comprises a vertically moveable plate disposed between said reservoir and said dispensing compartment, said plate regulating the amount of foodstuff dispensed as a function of the size of the opening it defines between said reservoir and said dispensing compartment.

7. The dispensing system of claim 1 wherein said dispenser means is semi-cylindrical to define a protected space within said dispenser compartment during dispensing to prevent crushing of said foodstuff.

8. The dispensing system of claim 1 wherein said dispenser compartment includes a dispensing opening and wherein said dispenser means comprises a manually operated rotatable member for removing said foodstuff from said dispenser compartment and for selectively blocking said dispensing opening.

9. The dispensing system of claim 8 wherein said rotatable member is semi-cylindrical to define a protected space compartment within said dispenser during dispensing to prevent crushing of said foodstuff.

10. A system for dispensing desired portions of a plurality of different dry, granular foodstuffs comprising:
    a) a mounting rack;

b) a plurality of foodstuff dispensers containing different foodstuffs attached to said mounting rack, each of said dispensers comprising;
  i) a reservoir containing a supply of said foodstuff;
  ii) a dispenser compartment communicating with said reservoir to receive foodstuff therefrom;
  iii) separator means (10) for limiting the quantity of foodstuff permitted to pass from said reservoir to said dispenser compartment; and
  iv) dispenser means connected to said dispenser compartment for dispensing said foodstuff from said dispenser compartment,
whereby the user may select, for a given foodstuff, the amount to be transferred from the reservoir to the dispenser compartment which is then dispensed.

11. The system of claim 10 further comprising a shelf attached to said mounting rack for supporting a container thereon below each of said dispenser means.

12. The dispensing system of claim 10 wherein said foodstuff dispensers are rotatably attached to said mounting rack thereby to permit said reservoirs to be rotated from an upright dispensing position to an inverted filling position, said reservoir including a removable lid for allowing said reservoirs to be filled with foodstuff to be dispensed.

13. The system of claim 10 wherein each of said separator means comprises a vertically moveable partition for selectively limiting the amount of foodstuff permitted to pass from the reservoir to said dispenser compartment as a function of its vertical position.

14. The dispensing system of claim 10 wherein each of said dispenser means is semi-cylindrical to define a protected space in the dispenser compartment corresponding thereto during dispensing to prevent crushing of said foodstuff.

15. The system of claim 10 wherein each of said reservoirs and the corresponding dispenser compartments have integral bottom surfaces which are downwardly disposed at an angle alpha with respect to the horizontal, said angle being sufficient so that all of said foodstuffs will slide on said bottom surfaces due to the force of gravity.

16. The system of claim 15 wherein said bottom surface of each of said foodstuff dispensers is attached to said mounting rack.

17. The dispensing system of claim 10 wherein each of said dispenser compartments includes a dispensing opening and wherein each of said dispenser means comprises a manually operated rotatable member for removing said foodstuff from said dispenser compartment and for selectively blocking said dispensing opening.

18. The dispensing system of claim 17 wherein said rotatable member is semi-cylindrical to define a protected space within said dispenser compartment during dispensing to prevent crushing of said foodstuff.

* * * * *